United States Patent
Byers et al.

(10) Patent No.: US 10,187,252 B2
(45) Date of Patent: Jan. 22, 2019

(54) CONFIGURING HETEROGENEOUS COMPUTING ENVIRONMENTS USING MACHINE LEARNING

(71) Applicant: Cisco Technology, Inc., San Jose, CA (US)

(72) Inventors: Charles Calvin Byers, Wheaton, IL (US); Joseph Michael Clarke, Raleigh, NC (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 15/390,921

(22) Filed: Dec. 27, 2016

(65) Prior Publication Data

US 2018/0183660 A1 Jun. 28, 2018

(51) Int. Cl.
*G06F 15/177* (2006.01)
*H04L 12/24* (2006.01)
*G06N 99/00* (2010.01)

(52) U.S. Cl.
CPC ....... *H04L 41/0803* (2013.01); *G06N 99/005* (2013.01); *H04L 41/0853* (2013.01); *H04L 41/147* (2013.01); *H04L 41/22* (2013.01)

(58) Field of Classification Search
CPC ............. H04L 41/0803; H04L 41/0853; H04L 41/147; G06N 99/005
See application file for complete search history.

(56) References Cited

U.S. PATENT DOCUMENTS

| | | | |
|---|---|---|---|
| 6,516,305 B1 * | 2/2003 | Fraser | G06F 8/4434 341/51 |
| 7,770,157 B2 * | 8/2010 | Arnold | G06F 9/45504 717/130 |
| 8,352,951 B2 | 1/2013 | Das et al. | |
| 9,058,216 B2 * | 6/2015 | Frean | G06F 9/5027 |

(Continued)

OTHER PUBLICATIONS

Cullinan, et al., "Computing Performance Benchmarks among CPU, GPU, and FPGA", https://m.wpi.edu/Pubs/E-project/Available/E-project-030212-123508/unrestricted/Benchmarking_Final.pdf, 2013, 124 pages, WPI.

(Continued)

*Primary Examiner* — Mohamed A Wasel
(74) *Attorney, Agent, or Firm* — Parker Ibrahim & Berg LLP; James M. Behmke; Stephen D. LeBarron

(57) ABSTRACT

In one embodiment, a device receives data regarding a plurality of heterogeneous computing environments. The received data comprises measured application metrics for applications executed in the computing environments and indications of processing capabilities of the computing environments. The device generates a training dataset by applying a machine learning-based classifier to the received data regarding the plurality of existing heterogeneous environments. The device trains a machine learning-based configuration engine using the training dataset. The device uses the configuration engine to generate configuration parameters for a particular heterogeneous computing environment based on one or more system requirements of the particular heterogeneous computing environment. The device provides the configuration parameters to the particular heterogeneous computing environment.

20 Claims, 5 Drawing Sheets

(56) References Cited

U.S. PATENT DOCUMENTS

| | | | |
|---|---|---|---|
| 9,069,737 B1* | 6/2015 | Kimotho | G06F 11/1484 |
| 9,147,072 B2* | 9/2015 | Fawaz | G06F 21/552 |
| 9,235,278 B1* | 1/2016 | Cheng | G06F 3/0346 |
| 9,485,153 B2* | 11/2016 | Vasseur | H04L 41/5025 |
| 2011/0106286 A1* | 5/2011 | Lupetini | G05B 13/026 |
| | | | 700/103 |
| 2016/0055612 A1 | 2/2016 | Barik et al. | |
| 2016/0292420 A1* | 10/2016 | Langton | G06F 21/566 |
| 2018/0144263 A1* | 5/2018 | Saxena | G06F 9/48 |

OTHER PUBLICATIONS

Ganapathi, et al., "A Case for Machine Learning to Optimize Multicore Performance", https://www.usenix.org/legacy/event/hotpar09/tech/full_papers/ganapathi/ganapathi_html/, Accessed Oct. 25, 2016, 13 pages, USENIX.org.

Hall, et al., "Self-Configuring Applications for Heterogeneous Systems: Automating Programming Decisions Using Cognitive Techniques", Proceedings of the IEEE 96.5 (2008), 16 pages, IEEE.

Luk, et al., "Qilin: Exploiting Parallelism on Heterogeneous Multiprocessors with Adaptive Mapping", MICRO'09, Dec. 12-16, 2009, New York, NY, USA., 2009, ACM.

Stock, et al., "Using machine learning to improve automatic vectorization", ACM Transactions on Architecture and Code Optimization (TACO)—HIPEAC Papers, vol. 8 Issue 4, Jan. 2012, Article No. 50, ACM.

Wakabayashi, et al., "Mapping complex algorithm into FPGA with High Level Synthesis reconfigurable chips with High Level Synthesis compared with CPU, GPGPU", Design Automation Conference (ASP-DAC), 2014 19th Asia and South Pacific, Jan. 2014, pp. 282-284, IEEE.

Wang, et al., "Mapping Parallelism to Multi-cores: A Machine Learning Based Approach", PPoPP'09, Feb. 14-18, 2009, Raleigh, North Carolina, USA., 2009, ACM.

* cited by examiner

CONFIGURING HETEROGENEOUS COMPUTING ENVIRONMENTS USING MACHINE LEARNING

TECHNICAL FIELD

The present disclosure relates generally to computer networks, and, more particularly, to configuring heterogeneous computing environments using machine learning.

BACKGROUND

Various approaches to designing computer processors have led to a myriad of different processing platforms available today. For example, available central processing units (CPUs) now include processors that rely on Complex Instruction Set Computing (CISC) and other processors that rely on Reduced Instruction Set Computing (RISC). Specialized processors are also available such as Graphics Processing Units (GPUs), Digital Signal Processors (DSPs), etc., which are optimized for functions such as video processing, audio, motor control, and the like. Further processor types include Field Programmable Gate Arrays (FPGAs), which typically include millions of logic gates that can be configured to implement customized hardware that is optimized for a particular computation task. Additionally, Application Specific Integrated Circuits (ASICs) are also available, which include hardware solutions optimized for specific tasks (e.g., cryptographic processing, mining Bitcoins, video transcoding, etc.).

In general, heterogeneous computing environments attempt to leverage different types of processor architectures in the hopes of better matching the specific needs of the application software to the available architectures. For example, an application may use the GPU of the device for video rendering and the CPU of the device for other computational tasks. However, GPUs have also proven to be capable of handling compute-intensive tasks, thereby offering a programmatic choice to be made between processors. The assignment of various parts of the target computational algorithms to each type of processor must be made carefully to optimize factors such as: physical space, power dissipation, performance of the applications, etc. As the number of processors and processor types in a heterogeneous computing environment increase, so too do the number of options available as to where a given task or application is executed.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives data regarding a plurality of heterogeneous computing environments. The received data comprises measured application metrics for applications executed in the computing environments and indications of processing capabilities of the computing environments. The device generates a training dataset by applying a machine learning-based classifier to the received data regarding the plurality of existing heterogeneous environments. The device trains a machine learning-based configuration engine using the training dataset. The device uses the configuration engine to generate configuration parameters for a particular heterogeneous computing environment based on one or more system requirements of the particular heterogeneous computing environment. The device provides the configuration parameters to the particular heterogeneous computing environment.

DESCRIPTION

Figure 1:
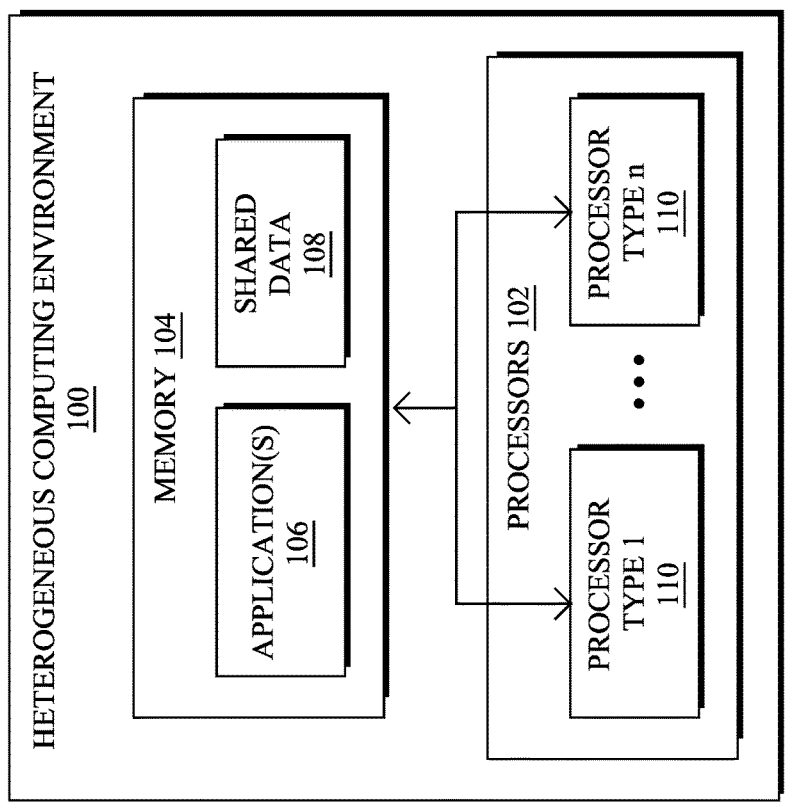
FIG. 1 illustrates an example heterogeneous computing environment.

In general, a heterogeneous computing environment refers to a device or set of devices that have multiple processor types. An example heterogeneous computing environment 100 is shown in FIG. 1. As shown, heterogeneous computing environment 100 may include any number of processors 102 and a memory 104 in communication therewith. During operation, processors 102 may execute portions of one or more applications 106 stored in memory 104. Example application portions may include, but are not limited to, threads, sub-routines, functions, container-based code, and the like. When executed by processors 102, these application portions may also read or write to shared data 108 in memory 104 that is accessible by the various processors 102.

Processors 102 in heterogeneous computing environment 100 may be of any number of different processor types 110 (e.g., a first through $n^{th}$ processor type). For example, processors 102 may include any number of different central processing units (CPUs) (e.g., Complex Instruction Set Computing (CISC)-based CPUs, Reduced Instruction Set Computing (RISC)-based CPUs, etc.), graphics processing units (GPUs), field programmable gate arrays (FPGAs), systems on a chip (SoCs), application specific integrated circuits (ASICs), application specific standard product (ASSP), digital signal processors (DSPs), and the like.

While memory 104 is shown as a single memory for purposes of illustration, it is to be appreciated that some heterogeneous computing environments may also include different types of memories. For example, in some embodiments, memory 104 may comprise a combination of cache, Random Access memory (RAM), Single-Level Cell (SLC) Solid-State Drive (SSD), Multi-Level Cell (MLC) SSD, rotating disk, attached Redundant Array of Independent Disks (RAID) array, or network storage.

In some cases, heterogeneous computing environment 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, industrial machines, healthcare devices, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or power line communication (PLC) networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture.

Further example implementations of heterogeneous computing environment 100 include other distributed computing environments, such as fog-based and cloud-based environments, as well as combinations thereof. Generally, cloud-based computing environments attempt to offload computational tasks to remote servers (e.g., via the Internet), as opposed to performing the task on the local device or on a local server. Fog-based computing, in contrast, takes a different approach by leveraging devices at or near the edge of the local network to perform computational tasks. For example, certain computational tasks can be offloaded to an edge router of the local network, thereby reducing the computational load of the endpoint node/device in the local network and also reducing external bandwidth consumption, as would be required to communicate with a cloud-based environment via the Internet. Computational nodes in both the cloud and fog could use heterogeneous processors.

Figure 2:
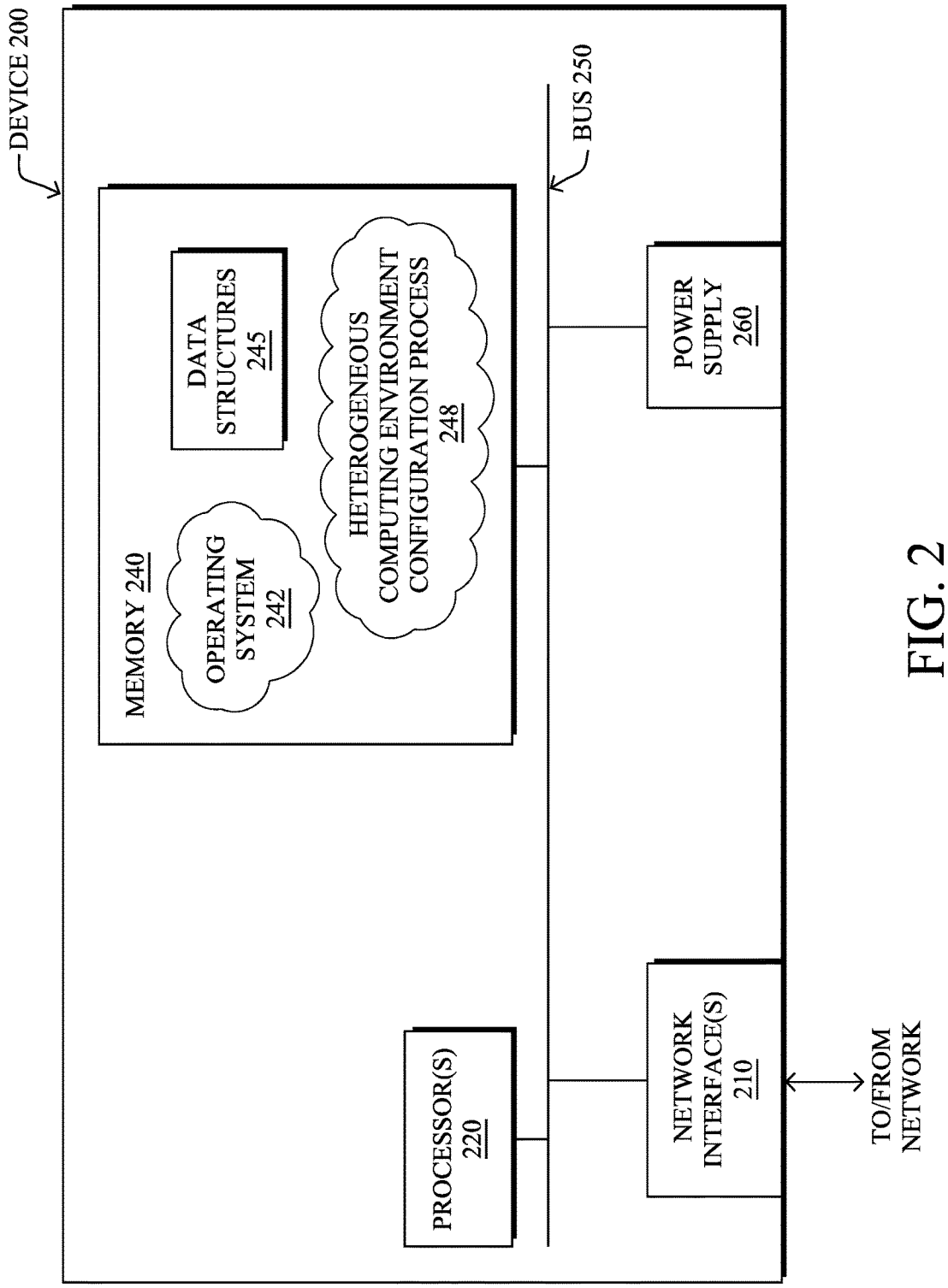
FIG. 2 illustrates an example supervisory device for a heterogeneous computing environment.

FIG. 2 is a schematic block diagram of an example node/device 200 that may be used with one or more embodiments described herein, e.g., as any form of computing device (e.g., personal computing device, server, router, vehicle, etc.) in communication with a heterogeneous computing environment. The device 200 may also be any other suitable type of device depending upon the type of network architecture in place, such as IoT nodes, etc. As shown, device 200 comprises one or more network interfaces 210, one or more processors 220 which may have heterogeneous architectures, and a memory 240 interconnected by a system bus 250, and is powered by a power supply 260.

The network interfaces 210 include the mechanical, electrical, and signaling circuitry for communicating data over physical links coupled to a computer network. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise heterogeneous computing environment configuration process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Heterogeneous computing environment configuration process 248 includes computer executable instructions that, when executed by processor(s) 220, cause device 200 to configure a particular heterogeneous computing environment to execute a given application. Notably, heterogeneous computing environment configuration process 248 may determine where different portions of the application should execute in the environment, based on the various processor types and other capabilities of the computing environment. For example, in the case of an IoT environment, heterogeneous computing environment configuration process 248 may determine whether a given portion of the application is best executed on a local or cloud-based server, on a fog computing device, or on one or more of the IoT endpoint nodes themselves. Process 248 may also determine by which heterogeneous processor types an application will execute in device 200, if processor(s) 220 include more than one type of compute element.

In various embodiments, heterogeneous computing environment configuration process 248 may utilize machine learning techniques, to configure the heterogeneous computing environment. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood determined by M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior measurements, may make control decisions based on the effects of prior control commands, etc.

Example machine learning techniques that may be used by heterogeneous computing environment configuration process 248 to configure the heterogeneous computing environment to execute a given application may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of configuring a heterogeneous computing environment is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of difference (e.g., using a Euclidian distance and a cluster based local outlier factor that takes into account the cluster density). For example, in some cases, a classifier may be trained to input a possible configuration for an application and heterogeneous computing environment and output a label that classifies the configuration as an improvement or detriment to the current performance.

Replicator techniques may also be used to configure a heterogeneous computing environment. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, heterogeneous computing environment configuration process 248 may also use graph-based models to configure a heterogeneous computing environment. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of determining an optimal location to execute a portion of the application.

As noted above, any number of alternative processing implementations exist for an application in a heterogeneous computing system. While some attempts have been made to optimally distribute execution tasks across different processors, these approaches often start with the premise that all portions of the application have already been ported to the various processor types. In turn, the optimization entails simply selecting the best processor for each portion of the code. However, and particularly in the case of network-based heterogeneous computing environments, any or all of the following conditions may exist:

The entirety of the application may not have been ported to each of the available processor types.

The notion of "optimal" may differ across applications and computing environments. Example factors to optimize may include, but are not limited to, throughput, latency, inter-processor communication bandwidth, intermediate storage capacity, network input/output (I/O) bandwidth, energy use, physical volume, etc.

The tradeoffs in selecting a given processor or processor type over another may not be evident on system design.

Configuring Heterogeneous Computing Environments Using Machine Learning

The techniques herein leverage machine learning to automate the partitioning of applications such as multi-stage analytics between heterogeneous processor types (e.g., CISC, RISC, GPU, FPGA, DSP, ASSP, etc.) and/or memory types (e.g., SSD, RAID, network storage, etc.) in a particular heterogeneous computing environment. In some aspects, the techniques can be used at initial system startup (e.g., based on observations of other heterogeneous computing environments). In further aspects, the techniques herein can be used during runtime to dynamically modify the configuration of the environment. Said modification could be in response to dynamic conditions (e.g., overloads) or events (e.g., failure of a network link or node). In further aspects, the techniques herein can be used to determine which application portions should be ported to which processor types, even when no such porting currently exists.

Specifically, according to one or more embodiments of the disclosure as described in detail below, a device receives data regarding a plurality of heterogeneous computing environments. The received data comprises measured application metrics for applications executed in the computing environments and indications of processing capabilities of the computing environments. The device generates a training dataset by applying a machine learning-based classifier to the received data regarding the plurality of existing heterogeneous environments. The device trains a machine learning-based configuration engine using the training dataset. The device uses the configuration engine to generate configuration parameters for a particular heterogeneous computing environment based on one or more system requirements of the particular heterogeneous computing environment. The device provides the configuration parameters to the particular heterogeneous computing environment.

Illustratively, the techniques described herein may be performed by hardware, software, and/or firmware, such as in accordance with the environment configuration process 248, which may include computer executable instructions executed by the processor 220 to perform functions relating to the techniques described herein.

Figure 3:
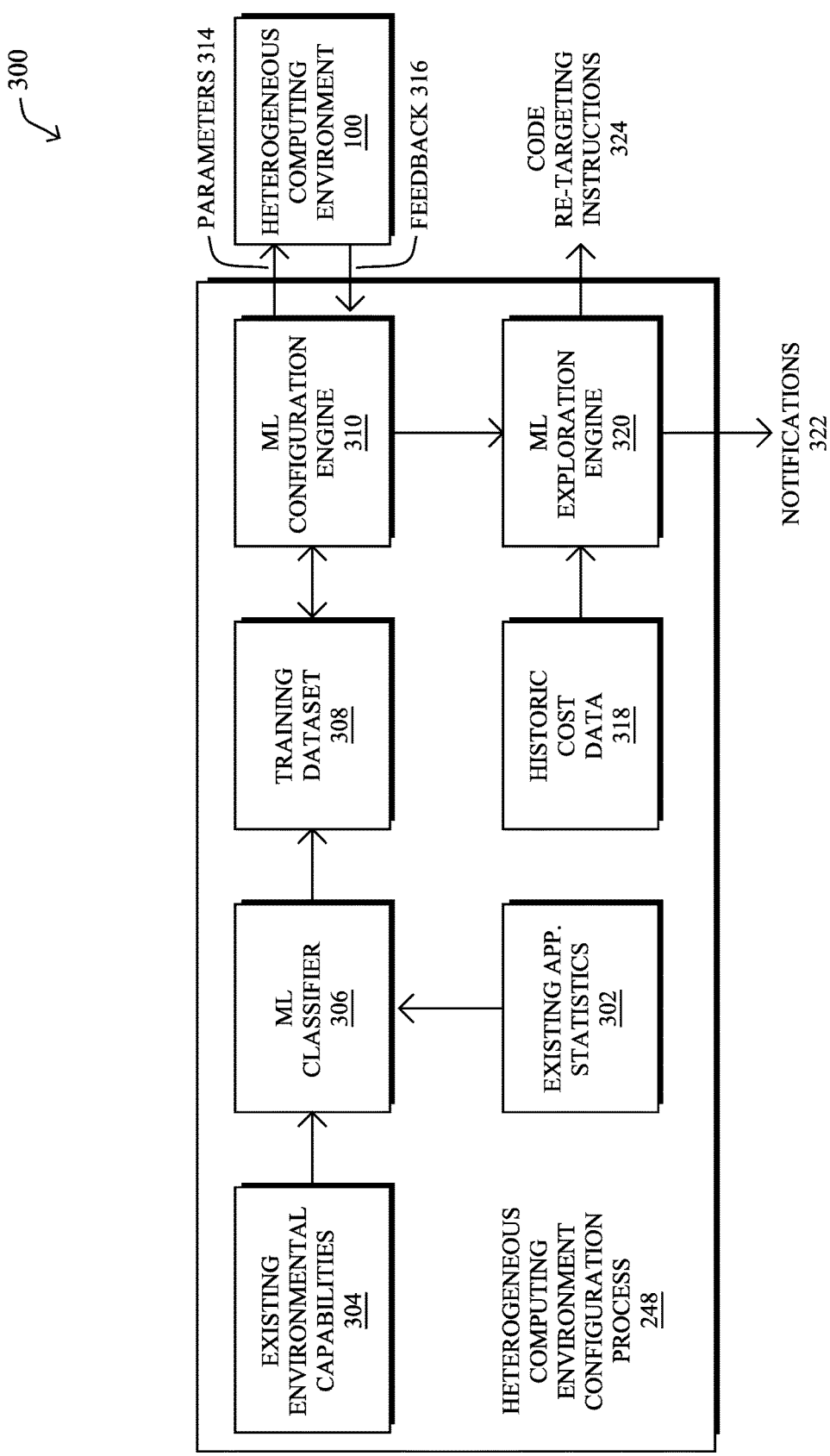
FIG. 3 illustrates an example architecture for configuring a heterogeneous computing environment.

Operationally, FIG. 3 illustrates an example architecture 300 for configuring a heterogeneous computing environment, in accordance with the techniques herein. As shown, heterogeneous computing environment configuration process 248 may include any number of sub-processes and access any number of data storage locations either locally on a single device, across multiple devices in a distributed manner, or anywhere on the Internet. Additionally, while specific sub-processes and data storage locations are shown in architecture 300, any number of different implementations are possible using the techniques herein (e.g., by combining the functions of the sub-processes shown, by having one sub-process perform the functions of another sub-process shown, etc.).

Heterogeneous computing environment configuration process 248 may implement any or all of the following operational modes: 1.) a training phase mode in which observations regarding the behavior and performance parameters of software currently executing on heterogeneous are used to form a training dataset, 2.) an automated execution phase in which the training dataset is used to train a machine learning-based configuration engine that controls the configuration of a particular heterogeneous computing environment, and/or 3.) a recommendation phase in which changes are suggested, such as recommended porting of a piece of code for execution on a different processor type. Heterogeneous computing environment configuration process 248 may operate in any or all of the above modes serially or in parallel, in various implementations.

In general, the training phase mode of heterogeneous computing environment configuration process 248 seeks to learn the behavior and performance parameters of software currently executing on existing heterogeneous environments. At the core of this functionality is a machine learning-based classifier 306, such as a neural network-based classifier or other classifier using another classification technique.

Classifier 306 may take as input the statistics 302 for the observed applications that are executed in the existing heterogeneous computing environments. For example, classifier 306 may analyze application code targeted to a specific system, looking for opportunities for converting single thread sections for parallel execution. Classifier 306 can also assess the detailed performance metrics in statistics 302 of the execution threads in the existing heterogeneous systems. These performance metrics can include, but are not limited to, features like CPU occupancy, latency, I/O bandwidth, inter-process communication (IPC) traffic, memory size and bandwidth, cache size and bandwidth, context size, stall times and reasons, degree of parallelism, multi-processor penalty factors, etc.

In addition, classifier 306 may use as input data regarding the capabilities 304 of the existing heterogeneous computing environments. Thus, in some embodiments, classifier 306 may learn the predicted performance under different parallel execution partitioning and multiprocessor typologies. Capabilities 304 may, in some cases, include measured performance metrics of the existing environments and configurations under various workloads, such as CPU throughput, memory bandwidth and occupancy, I/O traffic, context switch statistics, IPC bus load, etc., which classifier 306 may use to build a baseline of the behavior of the existing heterogeneous environments. Existing environmental capabilities 304 may also take into account factors associated with the partitioning of workloads across multiple nodes in a network, some of which may execute as parallel peers and some of which may be arranged in a hierarchy. In further embodiments, capabilities 304 may also include information regarding any automatic code conversion systems that have been deployed to the existing environments. In general, such systems may be operable to port software from one platform to another, automatically. Example metrics in this case may include how efficiently these systems convert code from one processor type to another, how much manual intervention is required after conversion, how much speed-up (or other efficiency improvement) is achieved after the conversion, etc.

In some embodiments, capabilities 304 may include information regarding the memory storage capabilities of the various heterogeneous computing environments in addition to, or in lieu of, the processing capabilities of the environments. Notably, many computing environments may also leverage any number of different types of memories such as, but not limited to, cache, Random Access memory (RAM), Single-Level Cell (SLC) Solid-State Drive (SSD), Multi-Level Cell (MLC) SSD, rotating disk, attached Redundant Array of Independent Disks (RAID) array, network storage, or the like. In such cases, capabilities 304 may also include various memory-related statistics such as latency, read times, write times, power usage, etc. In other words, heterogeneous computing environment configuration process 248 may, in some cases, be operable to control the configuration of the memories used by a heterogeneous computing environment to execute an application in addition to, or in lieu of, the processors used to execute the application.

Based on the application statistics 302 and environmental capabilities 304 observed in the existing heterogeneous computing environments, classifier 306 may perform machine learning-based classification to classify the performance of the different application and environmental configurations. Thus, as an output, classifier 306 may construct a training dataset 308 that generally maps the execution strategies of code in different computing environments to performance metrics. In other words, training dataset 308 may comprise one or more training datasets that can be used for purposes of training a machine learning process.

In the automated execution phase of operation, heterogeneous computing environment configuration process 248 may execute a machine learning-based configuration engine 310 to output a configuration for a particular heterogeneous computing environment based on the training dataset in training dataset 308. For example, in the case of a new heterogeneous computing environment that is to be deployed, configuration engine 310 may receive data indicative of the requirements 312 of the new environment in terms of the application(s) to be deployed, which ports of the application exist (e.g., which portions of the applications are already ported to the various processor types), and the desired performance metrics for the environment (e.g., in terms of processing speed, bandwidth, capacity, scalability, etc.). Requirements 312 may also include information regarding the specific hardware available in the new heterogeneous computing environment, as well (e.g., the number and types of processors in the new environment, etc.). As would be appreciated, the specific hardware in the new environment may or may not be the same or similar to that of the existing environments used to construct training dataset 308.

In various embodiments, configuration engine 310 may use training dataset 308 to obtain an optimal configuration for the new environment based on similar software and system configurations that have been observed before in other heterogeneous computing environments. In particular, configuration engine 310 may attempt to optimize the mapping of execution modules/application portions to the processor resources that are able to accept them in the new environment.

For example, in a video processing system, configuration engine 310 may put decompression on a DSP, feature extraction on a GPU, and pattern matching on a RISC cluster. In another example, in massively parallel processor systems, configuration engine 310 may select the most efficient number of nodes to employ, and the best topology (e.g., ring, bus, mesh, hypercube, etc.) to interconnect the nodes.

Configuration engine 310 may consider many different combinations of processor resources, as well as many different parallel mappings across multiple processor farms for each basic combination, based on training dataset 308. When configuration engine 310 discovers an optimal mapping for the target environment, it may send system configuration parameters to the target environment. For example, assume that heterogeneous computing environment 100 is being deployed and has associated requirements 312. In such a case, configuration engine 310 may generate and send configuration parameters 314 to heterogeneous computing environment 100, to configure the environment to execute a given application or set of applications. Configuration parameters 314 may automatically reserve the needed processors and/or memories of each type in environment 100, load the execution modules/application portions that run on the selected processor types onto the resources in environment 100, partition the data, and/or prompt execution of the application in environment 100.

In some embodiments, configuration engine 310 may also receive feedback 316 from heterogeneous computing environment 100 regarding the performance of the application(s) in environment 100. This allows configuration engine 310 to detect changes in heterogeneous computing environment 100 that may call for tuning of the mappings. In addition, feedback 316 may also allow configuration engine 310 to leverage additional training data points from feedback 316 to update training dataset 308 and the machine learning of configuration engine 310. For example, configuration engine 310 may use reinforcement learning or simple retraining to provide dynamic, closed loop control over the configuration of heterogeneous computing environment 100 (e.g., by sending updated configuration parameters 314 as needed).

In its recommendation phase of operation, heterogeneous computing environment configuration process 248 may also attempt to explore other possible configurations for heterogeneous computing environment 100. As noted above, in many heterogeneous computing environments, it is often not practical to re-code/port each portion of an application to target each of the available processor types in the environment. In various embodiments, heterogeneous computing environment configuration process 248 may also include a machine learning-based exploration engine 320 that is operable to explore new configurations for environment 100 that are not currently available, but are possible. By way of example, exploration engine 320 may be able to draw inferences regarding the current configuration of heterogeneous computing environment 100 (e.g., from configuration engine 310), such as "if only the cryptography module could be ported from x86 to FPGA, the execution of this application could be sped up by 30%." Exploration engine 320 could also make use of various simulation and profiling techniques to better characterize the capabilities of each alternative it is considering.

Exploration engine 320 may be operable to identify opportunities to re-code/port portions of the deployed application while taking into account both requirements 312, as well as any potential performance gains. In one embodiment, exploration engine 320 may also take as input historic cost data 318. Historic cost data 318 may generally include information regarding historical efforts and times to re-code/port applications in heterogeneous computing environment 100 and/or any of the other heterogeneous computing environments. For example, historic cost data 318 may indicate whether an automatic code conversion system is available to port at least a portion of the application from one processor type to another. If not, then a manual porting may be required, which has a significantly higher associated 'cost,' which exploration engine 320 may take into account when exploring possible changes.

In some embodiments, exploration engine 320 may provide code re-targeting instructions 324 to a code conversion system, based on a determination that an explored porting would improve the performance of heterogeneous computing environment 100. For example, instructions 324 may instruct the conversion system to port a cryptographic module of the application from x86 to execute on an FPGA present in environment 100. When the ported module then becomes available, configuration engine 310 may automatically implement the change to environment 100 via configuration parameters 314 or do so after receiving confirmation of the change from a user interface.

In further embodiments, exploration engine 320 may include data regarding an explored change in notification(s) 322 and send notification(s) 322 to one or more user interfaces for review. For example, if a manual porting of a portion of the application is predicted to increase performance by a certain amount, exploration engine 320 may send a corresponding notification 322 to the interested parties such as managers, included in agile method burndown charts, or the like. This allows the human users of heterogeneous computing environment configuration process 248 to make intelligent decisions as to what changes, if any, would improve the efficiency of the application(s) deployed to heterogeneous computing environment 100.

Figure 4:
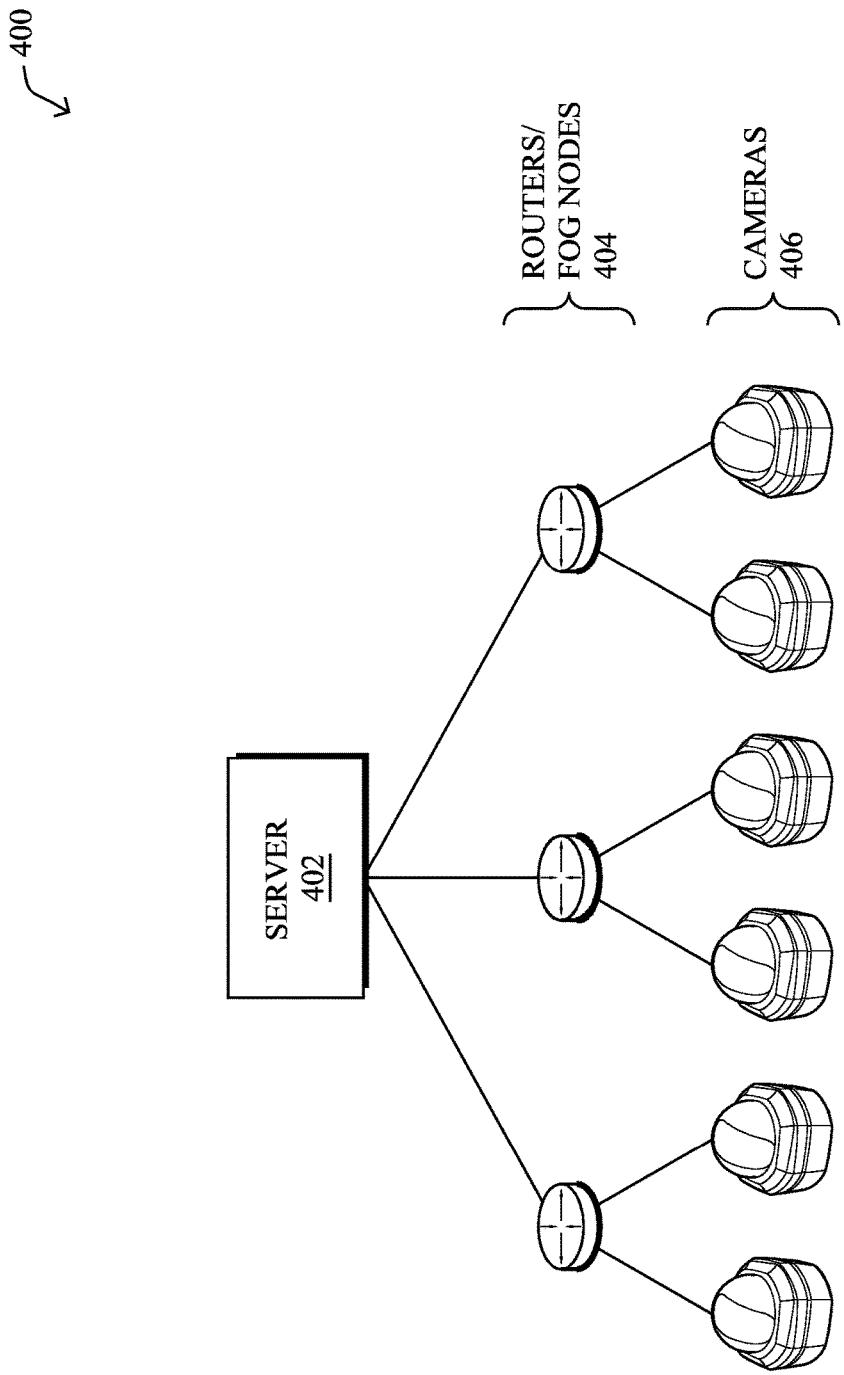
FIG. 4 illustrates an example security system.

FIG. 4 illustrates an example security system 400 to which the techniques herein could be applied, according to various embodiments. As shown, assume that a plurality of cameras 406 have been installed at various points of a geographic location, such as an airport. From a networking standpoint, different sets of cameras 406 may be linked to different fog computing nodes 404 (e.g., routers, other networking equipment, etc.). For example, the cameras 406 in a first terminal of the airport may be networked to a first one of fog nodes 404, the cameras 406 in a second terminal of the airport may be networked to a second one of fog nodes 404, etc. Also shown is a server 402 in communication with fog nodes 404 via the network.

As shown, security system 400 may form a hierarchy of different devices, each of which may have different hardware (e.g., processor types, etc.) and different capabilities. For example, while a given camera 406 may have a local processor and may be able to make some local computations, fog nodes 404 may have moderately powerful capabilities, and server 402 may have different, more powerful and/or specialized processors available. In other words, security system 400 represents one possible hierarchical computing environment that executes a surveillance application, to monitor the airport or other location. Each node in the hierarchy may include heterogeneous processor resources of multiple types, requiring the system of this invention to optimally configure.

By way of illustration of the techniques herein, assume that the surveillance application includes a facial recognition module that performs facial recognition on the images captured by cameras 406. In some cases, such a module may typically be executed by server 402. However, various other execution possibilities exist in security system 400. For example, it may be possible to instead perform the facial recognition on one or more of fog nodes 404 and/or on cameras 406 directly.

Using the techniques herein, the configuration process may use information regarding other heterogeneous computing environments (e.g., other security system deployments, etc.), to determine whether the performance of the application would be improved by instead performing the facial recognition using the hardware of the fog node(s) 404 and/or camera(s) 406, or using different combinations of the heterogeneous processor elements on any of those layers. In some cases, even if the facial recognition module is currently only ported for execution by server 402, the techniques herein can still explore the potential effects of other execution locations and suggest such a porting or automatically effect such a porting, accordingly.

Figure 5:
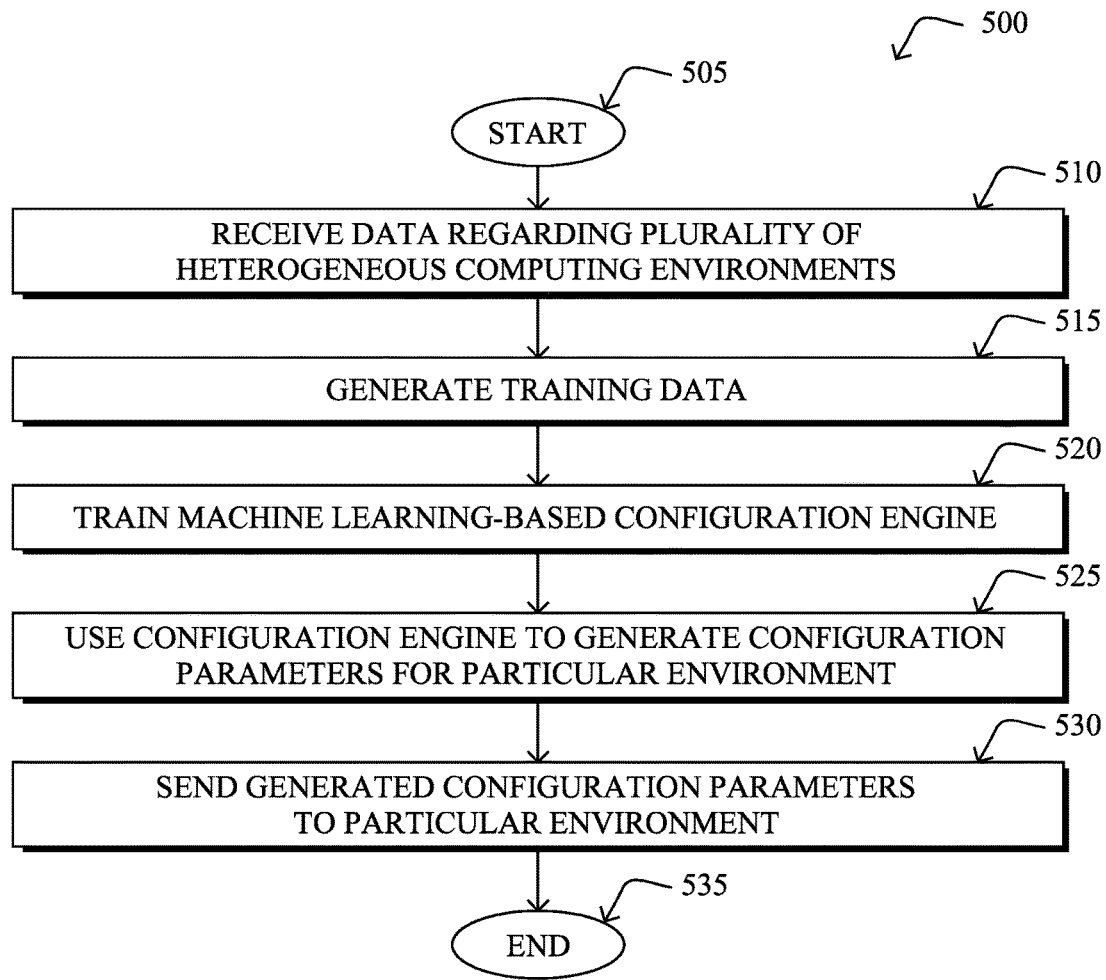
FIG. 5 illustrates an example simplified procedure for configuring a heterogeneous computing environment.

FIG. 5 illustrates an example simplified procedure for configuring a heterogeneous computing environment, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, a device may receive data regarding a plurality of heterogeneous computing environments. In some embodiments, the received data may include measured application metrics for applications executed in the computing environments and indications of processing capabilities of the computing environments. For example and with respect to an observed environment, the device may receive information regarding which processor types are present in the environment, where portions of the application are executing (e.g., on which processors/types), and measured performance metrics associated with this configuration.

At step 515, as detailed above, the device may generate a training dataset by applying a machine learning-based classifier to the received data regarding the plurality of existing heterogeneous environments. For example, taking the configuration information and measured performance metrics as input, such a classifier may output a classification that represents how well a particular configuration performs. Thus, the resulting training dataset may indicate when a given configuration (e.g., a facial recognition module running on a server's hardware) results in a certain performance.

At step 520, the device may train a machine learning-based configuration engine using the training dataset, as described in greater detail above. In general, the configuration engine may be operable to take as input requirements for a particular heterogeneous computing environment (e.g., in terms of performance, cost functions, etc.) and output configurations for the environment that satisfy the requirements. For example, one set of configuration parameters may select between different processor types, which may be on different devices in the environment, to execute a particular portion of the application.

At step 525, as detailed above, the device may use the configuration engine to generate configuration parameters for a particular heterogeneous computing environment. In some embodiments, the device may do so based on one or more system requirements of the particular heterogeneous computing environment. For example, in the case of a new heterogeneous computing environment to which an application is to be deployed, the device may determine the optimal configuration for the environment in view of the specified requirements. For existing heterogeneous compute environments, the device may also take into account recent performance measurements of the environment, and make configuration changes to tune it for better performance.

At step 530, the device may provide the configuration parameters to the particular heterogeneous computing environment, as described in greater detail above. Such configuration parameters may, for example, cause a particular processor type to execute a portion of the application that has been ported to the processor type. Further example parameters may cause the processors in the environment to perform parallel processing, reserve resources, coordinate data sharing between processors, host specific workloads on certain types of processor resources, or the like. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a machine learning-based mechanism that leverages a history of the applicability of code to heterogeneous processor execution, as well as the capabilities of the heterogeneous networks, to predict the performance of future configurations. In further aspects, the techniques herein may allow for the automatic partitioning of software across heterogeneous processor resources. In yet another aspect, the techniques herein can be used to automatically optimize the number of, and interconnect topology between CPUs, such as in massively multiprocessor systems. A further aspect of the techniques herein allows for the dynamic retuning of processor and/or memory partitioning across heterogeneous resources in response to feedback about changing software load or network status. Additionally, the techniques herein can automatically and continuously optimize various execution quality measures, including resource occupancy, performance, energy efficiency, etc. The techniques herein can further recommend which other application portions should be converted/ported over to other processor types.

While there have been shown and described illustrative embodiments that provide for configuring heterogeneous computing environments, it is to be understood that various other adaptations and modifications may be made within the spirit and scope of the embodiments herein. For example, while certain embodiments are described herein with respect to using certain machine learning models, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device, data regarding a plurality of heterogeneous computing environments, wherein the received data comprises measured application metrics for applications executed in the computing environments and indications of processing capabilities of the computing environments;

generating, by the device, a training dataset by applying a machine learning-based classifier to the received data regarding the plurality of existing heterogeneous environments;

training, by the device, a machine learning-based configuration engine using the training dataset;

using, by the device, the configuration engine to generate configuration parameters for a particular heterogeneous computing environment based on one or more system requirements of the particular heterogeneous computing environment; and providing, by the device, the configuration parameters to the particular heterogeneous computing environment.

2. The method as in claim 1, further comprising:
receiving, at the device, feedback from the particular heterogeneous computing environment regarding a performance of an application in the particular environment.

3. The method as in claim 2, further comprising:
adjusting, by the device, the configuration parameters for the particular heterogeneous computing environment based in part on the received feedback.

4. The method as in claim 1, wherein the measured application metrics comprise one or more of: central processing unit (CPU) occupancy, latency, input/output (I/O) bandwidth consumption, inter-process communication (IPC) traffic, memory consumption, context size, stall times, degree of parallelism, or multi-processor penalty factors.

5. The method as in claim 1, wherein the particular heterogeneous computing environment comprises at least one endpoint device, at least one fog computing device, and at least one server.

6. The method as in claim 1, further comprising:
executing, by the device, a machine learning-based exploration engine configured to predict a performance change for the particular heterogeneous computing environment that would result from creating a port of an application portion executed by a first processor type in the particular environment to a second processor type in the particular environment.

7. The method as in claim 6, further comprising:
providing, by the device, a notification to a user interface indicative of the port of the application portion and the predicted performance change.

8. The method as in claim 6, further comprising:
causing, by the device, creation of the port of the application portion by an automatic code generator.

9. The method as in claim 8, further comprising:
causing, by the device, deployment of the created port of the application portion to the second processor type in the particular heterogeneous computing environment.

10. An apparatus, comprising:
one or more network interfaces to communicate with a network;
a processor coupled to the network interfaces and configured to execute one or more processes; and
a memory configured to store a process executable by the processor, the process when executed operable to:
receive data regarding a plurality of heterogeneous computing environments, wherein the received data comprises measured application metrics for applications executed in the computing environments and indications of processing capabilities of the computing environments;

generate a training dataset by applying a machine learning-based classifier to the received data regarding the plurality of existing heterogeneous environments;

train a machine learning-based configuration engine using the training dataset;

use the configuration engine to generate configuration parameters for a particular heterogeneous computing environment based on one or more system requirements of the particular heterogeneous computing environment; and provide the configuration parameters to the particular heterogeneous computing environment.

11. The apparatus as in claim 10, wherein the process when executed is further operable to:
receive feedback from the particular heterogeneous computing environment regarding a performance of an application in the particular environment.

12. The apparatus as in claim 11, wherein the process when executed is further operable to:
adjust the configuration parameters for the particular heterogeneous computing environment based in part on the received feedback.

13. The apparatus as in claim 10, wherein the measured application metrics comprise one or more of: central processing unit (CPU) occupancy, latency, input/output (I/O) bandwidth consumption, inter-process communication (IPC) traffic, memory consumption, context size, stall times, degree of parallelism, or multi-processor penalty factors.

14. The apparatus as in claim 10, wherein the indications of the processing capabilities of the computing environments comprise indications of available memory types in the environments.

15. The apparatus as in claim 10, wherein the process when executed is further operable to:
execute a machine learning-based exploration engine configured to predict a performance change for the particular heterogeneous computing environment that would result from creating a port of an application portion executed by a first processor type in the particular environment to a second processor type in the particular environment.

16. The apparatus as in claim 15, wherein the process when executed is further operable to:
provide a notification to a user interface indicative of the port of the application portion and the predicted performance change.

17. The apparatus as in claim 15, wherein the process when executed is further operable to:
cause creation of the port of the application portion by an automatic code generator.

18. The apparatus as in claim 17, wherein the process when executed is further operable to:
cause deployment of the created port of the application portion to the second processor type in the particular heterogeneous computing environment.

19. A tangible, non-transitory, computer-readable medium storing program instructions that cause a device in a network to execute a process comprising:
receiving data regarding a plurality of heterogeneous computing environments, wherein the received data comprises measured application metrics for applications executed in the computing environments and indications of processing capabilities of the computing environments;

generating a training dataset by applying a machine learning-based classifier to the received data regarding the plurality of existing heterogeneous environments;

training a machine learning-based configuration engine using the training dataset;

using the configuration engine to generate configuration parameters for a particular heterogeneous computing environment based on one or more system requirements of the particular heterogeneous computing environment; and providing the configuration parameters to the particular heterogeneous computing environment.

20. The computer-readable medium as in claim 19, wherein the configuration parameters are provided to a fog computing device in the particular heterogeneous computing environment.

* * * * *